No. 838,206. PATENTED DEC. 11, 1906.
A. E. NORRIS.
HOISTING BUCKET.
APPLICATION FILED JUNE 22, 1906.
3 SHEETS—SHEET 1.
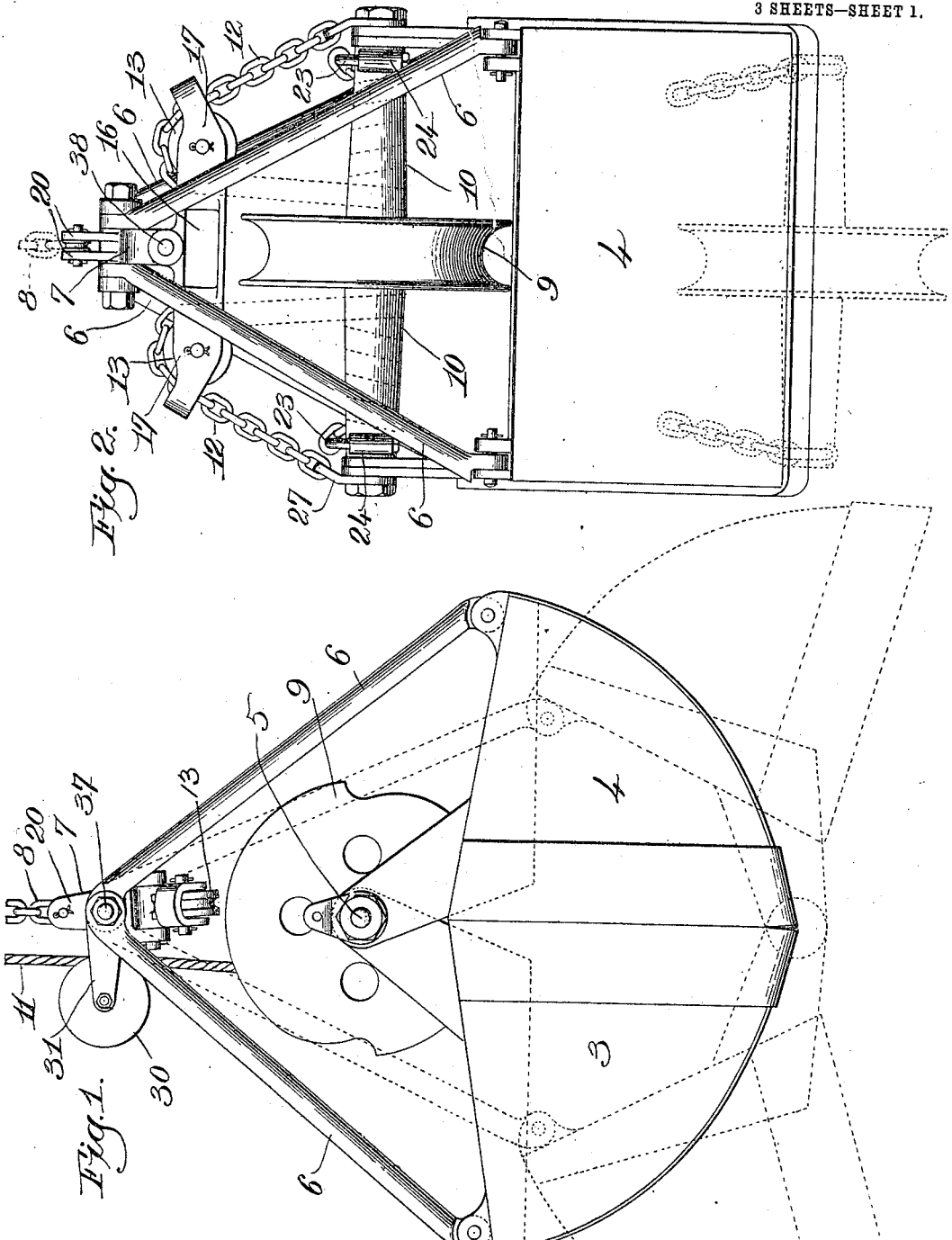

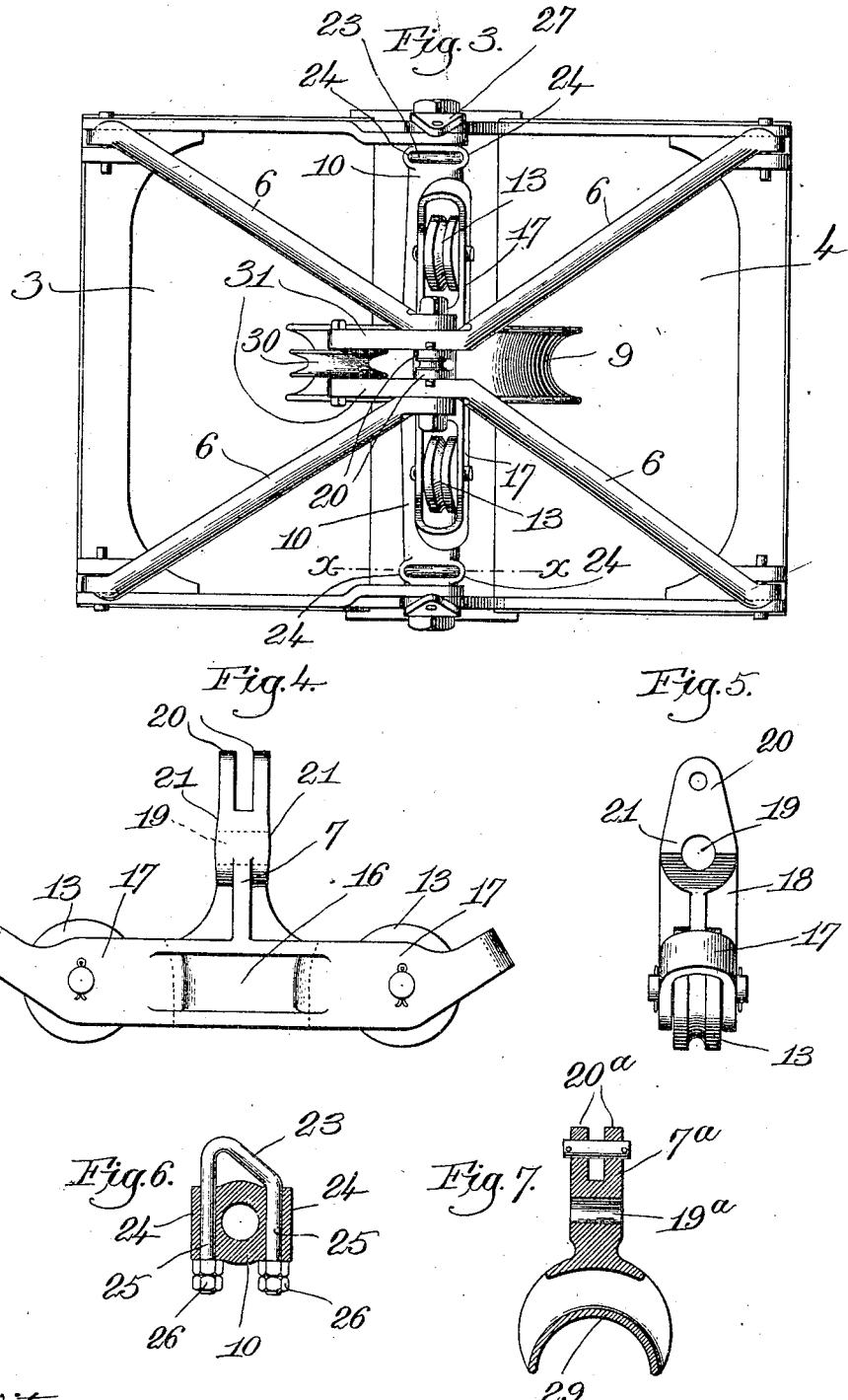

No. 838,206. PATENTED DEC. 11, 1906.
A. E. NORRIS.
HOISTING BUCKET.
APPLICATION FILED JUNE 22, 1906.
3 SHEETS—SHEET 3.
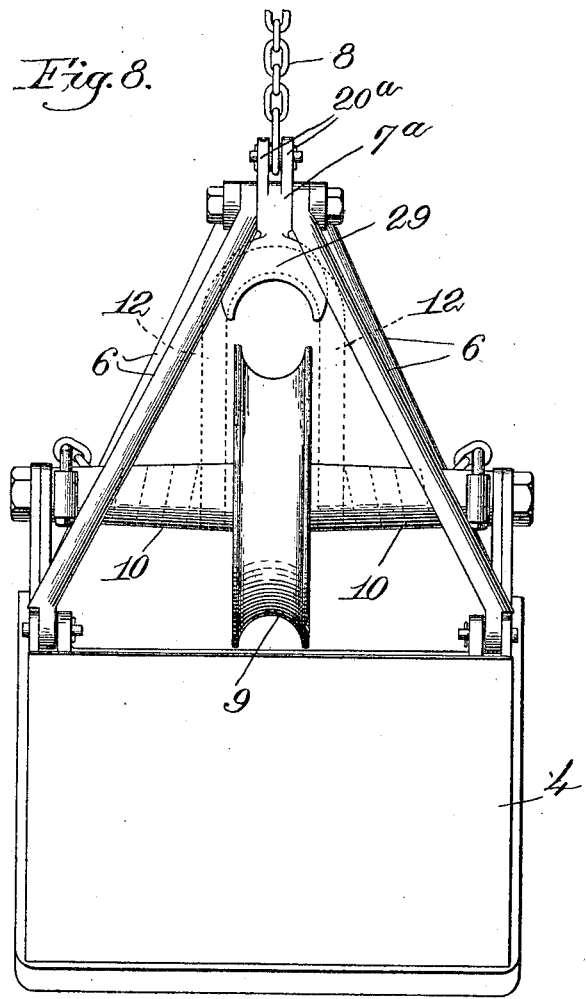
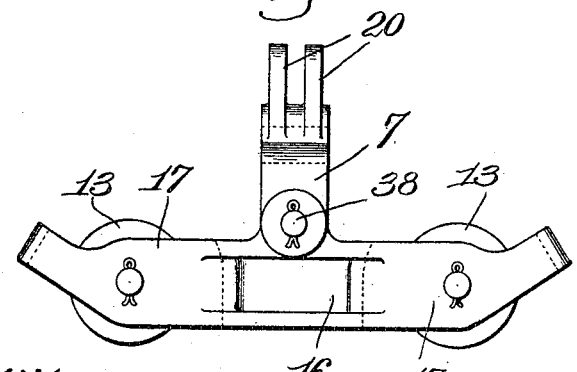
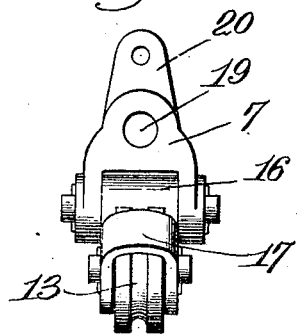
Witnesses:
Thomas Drummond
W. L. Friay
Inventor.
Almon E. Norris,
by Cooly Gregory attys.

UNITED STATES PATENT OFFICE.

ALMON E. NORRIS, OF CAMBRIDGE, MASSACHUSETTS.

HOISTING-BUCKET.

No. 838,206.   Specification of Letters Patent.   Patented Dec. 11, 1906.

Application filed June 22, 1906. Serial No. 322,815.

*To all whom it may concern:*

Be it known that I, ALMON E. NORRIS, a citizen of the United States, residing at Cambridge, county of Middlesex, and State of Massachusetts, have invented an Improvement in Hoisting-Buckets, of which the following description, in connection with the accompanying drawings, is a specification, like numerals on the drawings representing like parts.

This invention relates to hoisting-buckets of that class in which the winding-drum is supported by the pivoted bucket-segments, and has secured thereto to be wound thereabout a flexible connection or winding-rope, which passes over a pulley or support sustained by the head, said winding-drum being operated by the usual winding-and-closing rope.
The object of the present invention is to improve this type of bucket in the particulars hereinafter described and then pointed out in the claims.

In the drawings, Figure 1 is a side view of a bucket embodying my invention with the chains 12 omitted. Fig. 2 is an end view thereof. Fig. 3 is a top plan view with the holding-rope, the opening-and-closing rope, and the chains 12 omitted. Fig. 4 is a side view of one form of equalizer. Fig. 5 is an end view thereof. Fig. 6 is a section on the line $x\ x$, Fig. 3. Fig. 7 is a sectional view of a modified form of equalizer. Fig. 8 is an end view of a bucket in which the form of equalizer shown in Fig. 7 is employed. Fig. 9 is a side view of the equalizer shown in Fig. 2, and Fig. 10 is an end view of Fig. 9.

The bucket herein illustrated is of the clam-shell variety and has two bucket-segments 3 and 4, which are each pivotally mounted upon a pivotal rod or shaft 5 and which have pivoted to their rear sides links 6, that extend up to and are pivoted to the head-block 7, to which the holding rope or chain 8 is secured. Mounted on the pivotal shaft 5 is a winding-drum having a centrally-situated portion 9 of large diameter and at each end a portion 10 of smaller diameter. The opening-and-closing rope 11 extends around the portion 9 of large diameter and is fastened thereto at one end.

12 designates a flexible connection, such as a chain or rope which passes over a pulley or support sustained by the head-block and which has one end fastened to the portion 10 of the drum of smaller diameter and is adapted to be wound thereon by the turning of the drum to close the segments of the bucket together and which is unwound therefrom as the bucket-segments are opened. In the embodiment of the invention shown in Figs. 1, 2, and 3 there are two such flexible connections 12, one at either side of the bucket, each flexible connection being fastened at one end to the pivotal rod 5 and at the other end to the portion 10 of the winding-drum, said connection passing over a pulley 13, which is sustained by the head-block 7. In Fig. 8 the flexible connections extend from the center of the head-block to the two drum portions 10, and they are shown as connected together and as forming part of a single chain, although two separate chains might be used, both of which are connected to the head-block.

This general type of bucket is well known and its operation is so well understood to those skilled in the art that reference thereto is hardly necessary. I might say, however, that the opening and closing rope is wound on the drum 9 in a direction opposite to that in which the flexible connections 12 are wound thereon, so that when the opening-and-closing rope 11 is slackened the weight of the parts will cause the winding-drum to turn in a direction to unwind the chains or connections 12 therefrom, thus permitting the bucket to open, as shown in dotted lines, Fig. 1. During this time the opening-and-closing rope is wound up upon the drum 9, as will be obvious. For closing the bucket-segments the opening-and-closing rope is drawn upon, thus unwinding it from the drum 9 and causing the winding-drum to turn in a direction to wind the flexible connections 12 thereon.

It is very desirable in this class of bucket that the strains on the flexible connection should be equalized, so that substantially the same strain will be put upon the part of the flexible connection which is wound on each end of the winding-drum. This is especially true where two flexible connections are used. It will readily be understood that if the pulleys 13, for instance, in Fig. 2 were carried by a rigid head, as has been heretofore done, the slightest strain of one flexible connection or the loosening of a connection at either end thereof would throw nearly all the strain upon the other flexible connection.
Similarly, if the two portions of the flexible connections in Fig. 8 were separate from each other and both fastened to the head the stretching of one or the loosening of the connection thereof would throw all the stra n upon the other. To avoid this possibility and to provide a construction in which under all circumstances both connections 12 will be subjected to the same strain, I have provided an equalizing device for supporting the chains. In the embodiment of the invention shown in Figs. 1 and 9 this equalizing device is designated by 16 and is shown as having two laterally-extending arms 17, in which the pulleys 13 are journaled. Said equalizing device is hinged to the head-block 7, as at 38, so that it can swing slightly relative to said head-block, as necessary to equalize the strains upon the two flexible connections 12. The head-block is shown as having the ears 20, to which the holding-rope 8 is secured. Instead of making the head-block and the equalizer two separate parts which are pivoted together I may make them in one piece and so arrange the entire one-piece structure that it can swing upon the pivotal pin 37. Such a construction of equalizer is shown in Fig. 4, wherein the portion 16 is made integral with the head 7, and the hole 19 for the said head is made slightly larger than the pivotal pin 37, and, furthermore, the sides of the head-block against which the upper ends of the links 6 bear are slightly rounded, as shown at 21. This construction permits the equalizer with the head-block to swing laterally sufficiently to equalize the strains upon the flexible connections 12, even while the head-block is held tightly between the links 6.

In the embodiment of the invention shown in Figs. 7 and 8 the equalizer is shown in the form of a saddle 29, through which the flexible connection 12 passes. This saddle is formed with the head-block 7$^a$, and the latter has the usual aperture 19$^a$, through which the pivotal pin 37 passes, and it also has the ears 20$^a$, to which the holding-rope is secured. The flexible connection 12 is fastened at both ends to the two portions 10 of the winding-drum and passes through the saddle 29, as shown in Fig. 8. Since said flexible connection can slip in the saddle, it will be obvious that the strain will be equalized on both ends thereof.

Another feature of my invention relates to the manner in which the ends of the connections 12 are secured to the portions 10 of the drum of smaller diameter. Heretofore in this type of bucket the ends of the chains have been fastened to an ear projecting from a collar which has been shrunk onto the portions 10 of the drum of smaller diameter; but this construction is unsatisfactory, because either the collars very often work loose or the ears break off from the collars.

In my invention I secure the ends of the chains 12 to staples 23, which are secured to the portions 10 of the drum. The winding-drum may, if desired, be made in one casting, or the smaller portions 10 may be made from a casting and the larger portion 9 made as a separate piece placed on the casting. In either event the casting for the portions 10 are made with ears 24, through which the arms or sides 25 of the staple 23 passes, said staple being held in place by suitable nuts 26. This makes a simple construction, which can be easily manufactured and which is practically indestructible. There is, further, no danger of the connection for the ends of the chain becoming loose, as is the case when the connection is secured to a collar shrunk onto the drum 10. The other end of each flexible connection 12 in Fig. 2 is secured to an ear 27 which in turn is supported on the pivotal rod 5.

I have herein shown two of the links 6 as provided at their upper ends with extended arms 31, between which is pivoted a guide-sheave 30, adapted to engage the opening-and-closing rope 11 and act as a guide for the latter.

Having fully described my invention, what I claim as new, and desire to secure by Letters Patent, is—

1. In a hoisting-bucket, a head-block, two connected bucket-segments pivotally connected to the head-block, a winding-drum carried by said bucket-segments, a flexible connection secured at one end to said drum, and an equalizer sustained by said head-block over which said flexible connection passes.

2. In a hoisting-bucket, two pivotally-mounted bucket-segments, a winding-drum rotatably carried thereby, two flexible connections, each secured at one end to said winding-drum, means sustained by the head over which said flexible connections pass, means to rotate the drum to wind said flexible connections thereon for closing the bucket, and means to equalize the strains on said flexible connections.

3. In a hoisting-bucket, two pivotally-mounted bucket-segments, a drum rotatably carried thereby, two flexible connections each secured at one end to the bucket-segments and at the other end to the drum, an equalizer over which said flexible connections pass, and means to rotate the drum to wind said flexible connections thereon for closing the bucket.

4. In a hoisting-bucket, two pivotally-mounted bucket-segments, a drum rotatably carried thereby, two flexible connections each secured at one end to the bucket-segments and at the other end to the drum, a swinging equalizer over which said flexible connections pass, and means to rotate the drum to wind said flexible connections thereon for closing the bucket.

5. In a clam-shell bucket, two pivotally-mounted bucket-segments, links pivoted thereto, a pin to which all said links are pivoted, a drum carried by said bucket-segments, flexible connections secured at one end to the bucket-segments and at the other end to the drum, and an equalizer supported by said pin and over which said flexible connections pass.

6. In a clam-shell bucket, two bucket-segments, a drum carried thereby, a staple extending transversely through the drum, and a flexible connection secured at one end to the bucket-segments and at the other end to the staple.

7. In a hoisting-bucket, two pivotally-mounted bucket-segments, a drum rotatably carried thereby, said drum being provided with perforated ears, a staple extending through said ears, and a flexible connection secured at one end to the staple.

8. In a hoisting-bucket, two connected bucket-segments, a head-block to which said segments are connected, a winding-drum rotatably carried by said bucket, said drum being provided with perforated ears, a staple extending through said ears, a flexible connection secured at one end to said staple and connecting the drum with the head-block, and means to rotate the drum.

9. In a hoisting-bucket, two pivotally-connected bucket-segments, a head to which said bucket-segments are connected, a winding-drum rotatably carried by said bucket-segments, said drum being provided with two pairs of perforated ears, a staple extending through each pair of ears, a flexible connection secured to each staple, said flexible connections connecting the drum and the head-block, means to rotate the drum to wind said connections thereon, and means to equalize the strain on said connections.

10. In a hoisting-bucket, two pivotally-mounted bucket-segments, a head-block to which said segments are connected, a drum rotatably carried by said bucket-segments, said drum being provided with two pairs of perforated ears, a staple extending through each pair of ears, a flexible connection secured at one end to each staple, and an equalizer sustained by the head and to which the flexible connections are connected, whereby the strain on the flexible connections is equalized as the drum is wound.

In testimony whereof I have signed my name to this specification in the presence of two subscribing witnesses.

ALMON E. NORRIS.

Witnesses:
   LOUIS C. SMITH,
   MARGARET A. DUNN.